(12) United States Patent
Becker et al.

(10) Patent No.: US 10,949,400 B2
(45) Date of Patent: Mar. 16, 2021

(54) SYSTEMS AND METHODS FOR TAMPER-RESISTANT ACTIVITY LOGGING

(71) Applicant: Palantir Technologies Inc., Palo Alto, CA (US)

(72) Inventors: Nomi Becker, Livingston Manor, NY (US); Anne Ryan, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 264 days.

(21) Appl. No.: 15/981,783

(22) Filed: May 16, 2018

(65) Prior Publication Data

US 2019/0347339 A1 Nov. 14, 2019

Related U.S. Application Data

(60) Provisional application No. 62/669,104, filed on May 9, 2018.

(51) Int. Cl.
*G06F 16/18* (2019.01)
*G06F 11/34* (2006.01)
(Continued)

(52) U.S. Cl.
CPC ...... *G06F 16/1805* (2019.01); *G06F 11/3476* (2013.01); *G06F 21/50* (2013.01); *G06F 21/6218* (2013.01); *H04L 9/0643* (2013.01)

(58) Field of Classification Search
None
See application file for complete search history.

(56) References Cited

U.S. PATENT DOCUMENTS

| 5,978,475 A | 11/1999 | Schneier et al. |
| 6,253,203 B1 | 6/2001 | O'Flaherty et al. |

(Continued)

FOREIGN PATENT DOCUMENTS

| CN | 101729531 | 6/2010 |
| CN | 103281301 | 9/2013 |

(Continued)

OTHER PUBLICATIONS

Baker et al., "The Development of a Common Enumeration of Vulnerabilities and Exposures," Presented at the Second International Workshop on Recent Advances in Intrusion Detection, Sep. 7-9, 1999, pp. 35.

(Continued)

*Primary Examiner* — Robert W Beausoliel, Jr.
*Assistant Examiner* — Cheryl M Shechtman
(74) *Attorney, Agent, or Firm* — Sheppard Mullin Richter & Hampton LLP

(57) ABSTRACT

Systems and methods are provided for monitoring and logging all activity occurring in a system. The logged activity may include keystroke entries input into the system, user and/or application interactions with the system, access restriction conflicts, and the like. The logged activity may be stored in at least two datastores, at least one of which is an immutable, append-only datastore. Storage of the logged activity in the immutable, append-only datastore is performed using hash algorithms. Attempts at manipulating or at hiding malicious or unauthorized activity can be recognized due to all activity being captured in the immutable, append-only datastore.

20 Claims, 7 Drawing Sheets

(51) Int. Cl.
*H04L 9/06* (2006.01)
*G06F 21/62* (2013.01)
*G06F 21/50* (2013.01)

(56) References Cited

U.S. PATENT DOCUMENTS

| | | | |
|---|---|---|---|
| 6,725,240 B1 | 4/2004 | Asad et al. |
| 6,807,569 B1 | 10/2004 | Bhimani et al. |
| 7,017,046 B2 | 3/2006 | Doyle et al. |
| 7,069,586 B1 | 6/2006 | Winneg et al. |
| 7,225,468 B2 | 5/2007 | Waisman et al. |
| 7,395,436 B1* | 7/2008 | Nemovicher ....... G06F 21/6218 |
| | | | 713/166 |
| 7,596,285 B2 | 9/2009 | Brown et al. |
| 7,770,032 B2 | 8/2010 | Nesta et al. |
| 7,801,871 B2 | 9/2010 | Gosnell |
| 7,962,495 B2 | 6/2011 | Jain et al. |
| 8,181,253 B1 | 5/2012 | Zaitsev et al. |
| 8,190,893 B2 | 5/2012 | Benson et al. |
| 8,196,184 B2 | 6/2012 | Amirov et al. |
| 8,239,668 B1 | 8/2012 | Chen et al. |
| 8,301,904 B1 | 10/2012 | Gryaznov |
| 8,312,546 B2 | 11/2012 | Alme |
| 8,447,989 B2* | 5/2013 | Barrus ..................... G06F 21/64 |
| | | | 713/181 |
| 8,646,080 B2* | 2/2014 | Williamson .......... G06F 21/568 |
| | | | 726/22 |
| 8,683,322 B1 | 3/2014 | Cooper |
| 8,726,379 B1 | 5/2014 | Stiansen et al. |
| 8,769,412 B2 | 7/2014 | Gill et al. |
| 8,782,794 B2 | 7/2014 | Ramcharran |
| 8,931,043 B2 | 1/2015 | Cooper et al. |
| 9,021,260 B1 | 4/2015 | Falk et al. |
| 9,049,117 B1 | 6/2015 | Nucci et al. |
| 9,100,428 B1 | 8/2015 | Visbal |
| 9,335,897 B2 | 5/2016 | Goldenberg |
| 9,338,013 B2 | 5/2016 | Castellucci et al. |
| 2002/0112157 A1 | 8/2002 | Doyle et al. |
| 2004/0123139 A1 | 6/2004 | Aiello et al. |
| 2004/0153418 A1 | 8/2004 | Hanweck |
| 2004/0250124 A1 | 12/2004 | Chesla et al. |
| 2005/0157662 A1 | 7/2005 | Bingham et al. |
| 2005/0229256 A2 | 10/2005 | Banzhof |
| 2005/0262556 A1 | 11/2005 | Waisman et al. |
| 2005/0275638 A1 | 12/2005 | Kolmykov-Zotov et al. |
| 2006/0031928 A1 | 2/2006 | Conley et al. |
| 2006/0069912 A1 | 3/2006 | Zheng et al. |
| 2006/0179003 A1 | 8/2006 | Steele et al. |
| 2006/0212931 A1 | 9/2006 | Shull et al. |
| 2006/0218637 A1 | 9/2006 | Thomas et al. |
| 2006/0265747 A1 | 11/2006 | Judge |
| 2007/0143851 A1 | 6/2007 | Nicodemus |
| 2007/0294766 A1 | 12/2007 | Mir et al. |
| 2008/0104407 A1 | 5/2008 | Horne et al. |
| 2008/0201580 A1 | 8/2008 | Savitzky et al. |
| 2008/0222706 A1 | 9/2008 | Renaud et al. |
| 2008/0229422 A1 | 9/2008 | Hudis et al. |
| 2009/0103442 A1 | 4/2009 | Douville |
| 2009/0228701 A1 | 9/2009 | Lin |
| 2009/0328222 A1 | 12/2009 | Helman et al. |
| 2010/0077481 A1 | 3/2010 | Polyakov et al. |
| 2010/0100963 A1 | 4/2010 | Mahaffey |
| 2010/0179831 A1 | 7/2010 | Brown et al. |
| 2010/0228999 A1* | 9/2010 | Maheshwari ....... G06F 21/6218 |
| | | | 713/189 |
| 2010/0235915 A1 | 9/2010 | Memon et al. |
| 2010/0262688 A1 | 10/2010 | Hussain et al. |
| 2010/0330801 A1 | 12/2010 | Rouh |
| 2011/0060910 A1 | 3/2011 | Gormish et al. |
| 2011/0202555 A1 | 8/2011 | Cordover et al. |
| 2011/0219450 A1 | 9/2011 | McDougal et al. |
| 2012/0079592 A1 | 3/2012 | Pandrangi |
| 2012/0084866 A1 | 4/2012 | Stolfo |
| 2012/0110633 A1 | 5/2012 | An et al. |
| 2012/0110674 A1 | 5/2012 | Belani et al. |
| 2012/0131057 A1* | 5/2012 | Youn ................... G06F 21/6227 |
| | | | 707/781 |
| 2012/0169593 A1 | 7/2012 | Mak et al. |
| 2012/0218305 A1 | 8/2012 | Patterson et al. |
| 2012/0254129 A1 | 10/2012 | Wheeler et al. |
| 2012/0284791 A1 | 11/2012 | Miller et al. |
| 2012/0330801 A1 | 12/2012 | McDougal et al. |
| 2013/0019306 A1 | 1/2013 | Lagar-Cavilla et al. |
| 2013/0097709 A1 | 4/2013 | Basavapatna et al. |
| 2013/0110876 A1 | 5/2013 | Meijer et al. |
| 2013/0139268 A1 | 5/2013 | An et al. |
| 2013/0239217 A1 | 9/2013 | Kindler et al. |
| 2014/0006347 A1* | 1/2014 | Qureshi ................. G06F 21/53 |
| | | | 707/621 |
| 2014/0013451 A1 | 1/2014 | Kulka et al. |
| 2014/0059683 A1 | 2/2014 | Ashley |
| 2014/0123279 A1 | 5/2014 | Bishop et al. |
| 2014/0143009 A1 | 5/2014 | Brice et al. |
| 2014/0173712 A1 | 6/2014 | Ferdinand |
| 2014/0173738 A1 | 6/2014 | Condry et al. |
| 2014/0188895 A1 | 7/2014 | Wang et al. |
| 2014/0229422 A1 | 8/2014 | Jain et al. |
| 2014/0283107 A1 | 9/2014 | Walton et al. |
| 2014/0366132 A1 | 12/2014 | Stiansen et al. |
| 2015/0039565 A1 | 2/2015 | Lucas |
| 2015/0128274 A1 | 5/2015 | Giokas |
| 2015/0188715 A1 | 7/2015 | Castelluci et al. |
| 2015/0229664 A1 | 8/2015 | Hawthorn et al. |
| 2015/0248563 A1 | 9/2015 | Alfarano et al. |
| 2015/0261847 A1 | 9/2015 | Ducott et al. |
| 2015/0326601 A1 | 11/2015 | Grondin et al. |
| 2016/0004864 A1 | 1/2016 | Falk et al. |
| 2016/0028759 A1 | 1/2016 | Visbal |
| 2017/0235970 A1 | 8/2017 | Conner |
| 2017/0249461 A1* | 8/2017 | Permeh ................ G06F 21/554 |
| 2018/0063182 A1* | 3/2018 | Jones ................... G06F 21/6218 |

FOREIGN PATENT DOCUMENTS

| | | |
|---|---|---|
| EP | 1962222 | 8/2008 |
| EP | 2892197 | 7/2015 |
| EP | 2897051 | 7/2015 |
| EP | 2963578 | 1/2016 |
| EP | 2985974 | 2/2016 |
| NL | 2011642 | 8/2015 |
| WO | WO 2005/010685 | 2/2005 |

OTHER PUBLICATIONS

Bhuyan et al., "Network Anomaly Detection: Methods, Systems and Tools," First Quarter 2014, IEEE.

Crosby et al., "Efficient Data Structures for Tamper-Evident Logging," Department of Computer Science, Rice University, 2009, pp. 17.

FireEye—Products and Solutions Overview, <http://www.fireeye.com/products-and-solutions> Printed Jun. 30, 2014 in 3 pages.

FireEye, <http://www.fireeye.com/> Printed Jun. 30, 2014 in 2 pages.

Glaab et al., "EnrichNet: Network-Based Gene Set Enrichment Analysis," Bioinformatics 28.18 (2012): pp. i451-i457.

Hur et al., "SciMiner: web-based literature mining tool for target identification and functional enrichment analysis," Bioinformatics 25.6 (2009): pp. 838-840.

Lee et al., "A Data Mining and CIDF Based Approach for Detecting Novel and Distributed Intrusions," Lecture Notes in Computer Science, vol. 1907 Nov. 11, 2000, pp. 49-65.

Ma et al., "A New Approach to Secure Logging," ACM Transactions on Storage, vol. 5, No. 1, Article 2, Published Mar. 2009, 21 pages.

Schneier et al., "Automatic Event Stream Notarization Using Digital Signatures," Security Protocols, International Workshop Apr. 1996 Proceedings, Springer-Veriag, 1997, pp. 155-169, https://schneier.com/paper-event-stream.pdf.

Schneier et al., "Cryptographic Support for Secure Logs on Untrusted Machines," The Seventh USENIX Security Symposium Proceedings, USENIX Press, Jan. 1998, pp. 53-62, https://www.schneier.com/paper-secure-logs.pdf.

(56) References Cited

OTHER PUBLICATIONS

VirusTotal—About, <http://www.virustotal.com/en/about/> Printed Jun. 30, 2014 in 8 pages.
Waters et al., "Building an Encrypted and Searchable Audit Log," Published Jan. 9, 2004, 11 pages, http://www.parc.com/content/attachments/building_encrypted_searchable_5059_parc.pdf.
Zheng et al., "GOEAST: a web-based software toolkit for Gene Ontology enrichment analysis," Nucleic acids research 36.suppl 2 (2008): pp. W385-W363.
Cucurull et al., "Distributed Immutabilization of Secure Logs", Sep. 17, 2016, International Conference on Computer Analysis of Images and Patterns, CAIP 2017: Computer Analysis of Images and Patterns, 15 pages, retrieved Sep. 17, 2016.
Extended European Search Report for EP Appln. No. 19173051.4 dated Sep. 16, 2019, 8 pages.
Weir et al., "Cloud Accounting systems, the Audit Trail, Forensics and the EU GDPR: How Hard Can It Be?", Apr. 12, 2017, pp. 1-4, retrieved from the Internet: https://strathprints.strath.ac.uk/69134/1/Weir_etal_BAFA2017_Cloud_accounting_systems_the_audit_trail_forensics_and_the_EU.pdf, retrieved Sep. 6, 2019.

* cited by examiner

SYSTEMS AND METHODS FOR TAMPER-RESISTANT ACTIVITY LOGGING

CROSS REFERENCE TO RELATED APPLICATIONS

This application claims the benefit under 35 U.S.C. § 119(e) of U.S. Provisional Application Ser. No. 62/669,104, filed May 9, 2018, the content of which is incorporated by reference in its entirety into the present disclosure.

TECHNICAL FIELD

This disclosure relates to approaches for controlling system security through secure logging of system activity.

BACKGROUND

Deployments such as platforms for analyzing data can be subject to malicious attacks. Malicious attacks can entail the access and/or analysis of data that an attacker does not have the authority/permission to access, analyze, or otherwise manipulate. Malicious attacks can also be attempts by an attacker to hide their tracks by deleting evidence of their unauthorized activity. For example, a user may attempt to delete activity logs evidencing the user's malicious activity in a system. The user may perform these actions directly or through a compromised system agent or administrator.

SUMMARY

In accordance with one embodiment, a system comprises one or more processors, and a memory storing instructions that, when executed by the one or more processors, cause the system to log data manipulation activity in the system. The system further stores data manipulation activity logs in an append-only datastore with associated hash codes, and also stores the data manipulation activity logs with the associated hash codes in a system log separate from the append-only datastore. Storing the data manipulation activity logs may comprise encrypting the data manipulation activity logs and compressing the data manipulation activity logs. In some embodiments, the associated hash codes comprise sha-1 and/or sha-512 hash codes. In some embodiments, the hash codes comprise block addresses through which the data manipulation activity logs are accessed in the append-only datastore. The data manipulation logs stored in the append-only datastore are immutable. In some embodiments, the data manipulation activity comprises at least one of data manipulation activity at the system level, and data manipulation activity associated with user action at the system.

In some embodiments, additional data manipulation activity may be logged at one or more deployment servers operatively connected to the system. In some embodiments, the data manipulation activity comprises at least one of data manipulation activity at the deployment server level, data manipulation activity associated with user action at the deployment server level, and interactions between the system and one or more applications executing on the one or more deployment servers. In some embodiments, the data manipulation activity logs are stored in a system level log without the associated hash codes.

In some embodiments, keystroke activity based on user inputs to the system are logged. Keystroke activity logs are stored in the append-only datastore with associated hash codes, and the keystroke activity logs are stored with the associated hash codes in the system log separate from the append-only datastore. In some embodiments, potential access restriction conflicts at the system are logged, and potential access restriction conflicts logs are stored in the append-only datastore with associated hash codes. Moreover, the potential access restriction conflicts logs are stored with the associated hash codes in the system log separate from the append-only datastore. In some embodiments, the data manipulation activity logs are broken up into data chunks, and the data chunks are compressed. In some embodiments, the associated hash codes are re-stored enabling the storing of the data manipulation activity logs with the associated hash codes in the system log.

In accordance with another embodiment, a method can be implemented by a computing system including one or more physical processors and storage media storing machine-readable instructions. The method may comprise logging data manipulation activity in the computing system, generating hash codes based on the logged data manipulation activity, and storing data manipulation activity logs in an append-only datastore with the generated hash codes. The method may further comprise storing the data manipulation activity logs without the generated hash codes in a system log separate from the append-only datastore. In some embodiments, the hash codes comprise sha-1 hash codes. In some embodiments, the sha-1 hash codes comprise block addresses through which the data manipulation activity logs are accessed in the append-only datastore.

In some embodiments, the method may further comprise logging additional data manipulation activity at one or more deployment servers operatively connected to the computing system. Moreover, the method may further comprise generating hash codes based on the logged data manipulation activity, storing additional data manipulation activity logs in an append-only datastore with the generated hash codes, and storing the additional data manipulation activity logs without the generated hash codes in the system log separate from the append-only datastore.

In accordance with one embodiment, the generated hash codes are stored as part of the data manipulation activity logs. In some embodiments, the method may further comprise storing the data manipulation activity logs with the generated hash codes in a customer-controlled system log separate from the append-only datastore. In some embodiments, the method may further comprise breaking up the data manipulation activity logs into data chunks, and compressing the data chunks prior to storing the data manipulation activity logs.

These and other objects, features, and characteristics of the systems and/or methods disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

DETAILED DESCRIPTION

Figure 1:
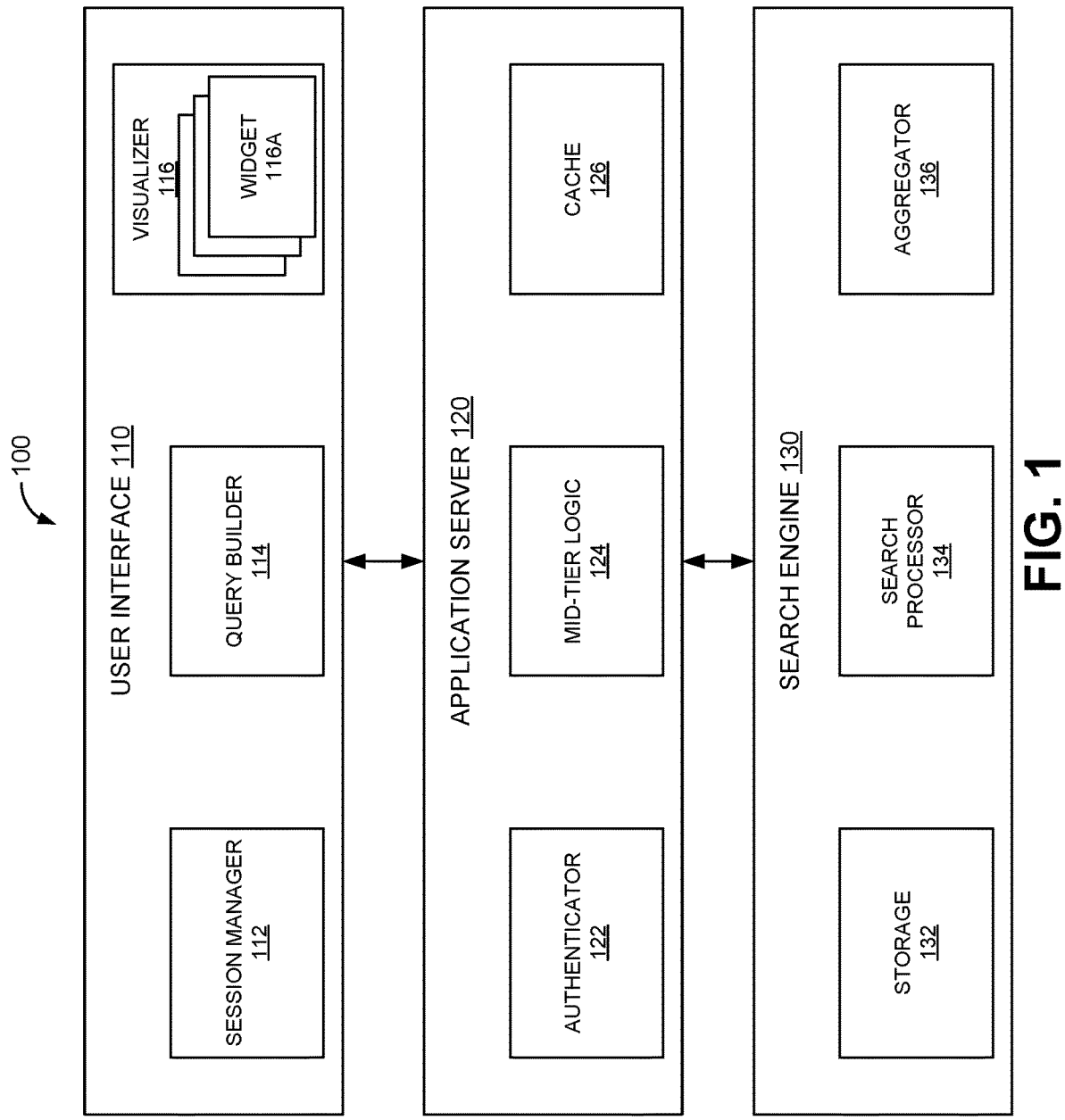
FIG. 1 illustrates an example data analysis system in accordance with one embodiment of the present disclosure.

Deployments can be subject to malicious attacks. Systems and methods of implementing and controlling security of a system/deployment can involve lockdown and audit functions. Lockdown functionality may entail automated firewall building to deny unauthorized attempts to connect to system infrastructure, as well as Security Technical Implementation Guide (STIG) automation for setting strict defaults for security-related functions. Audit functions can involve host-based intrusion detection system functionality for monitoring system components and recording attempts to circumvent security protocols, and monitoring calls into the system. Another aspect to controlling security revolves around providing secure login capabilities to the stack, and logging keyboard activity. Indeed, the National Standards and Technology (NIST) (from which STIG) originates has promulgated a standard/special publication (SP) 800-53, Rev. 4 broadly setting forth certain security requirements, checks for compliance with these security requirements, and remediation steps to execute when a system is not in compliance with security requirements. However, conventional security systems and methods do not provide a mechanism for logging all activity occurring at the system in a tamper-proof manner.

A claimed solution rooted in computer technology overcomes problems specifically arising in the realm of computer technology. In various embodiments, a security mechanism or toolkit that includes a tamper-proof logging component is provided. The tamper-proof logging component may monitor and record/log every read action, write action, or any other activity involving some manipulation of data, along with the user, time, date, and identity/characterization of the action that has taken place. The record/log is immutable, and the record/log is maintained in an append-only datastore as well as in a customer-accessible system log. In practice, there is no practical way in which a malicious user can remove or delete log entry/entries. Thus, even if some malicious action is performed, a log of that malicious action will be recorded.

In some embodiments, any activity involving data on the system can be logged and the log can be sent to an append-only datastore, e.g., as a 50 kb "chunk" of data. This chunk of data indicative of system activity can be encrypted and compressed, and a hash is created to store the data chunk in the append-only datastore. Moreover, the hash can also be stored in system logs, as well as pushed out externally through other pipelines, e.g., to the customer, along with log metadata for verifying the identity of the log. The hash can be a block address by which the corresponding data chunk is accessed. Thus, in order to, e.g., delete system logs, a malicious user would need to delete the system logs, access the append-only datastore, determine where the log is stored in the append-only datastore, and delete that version of the system logs. However, this would lead to re-generating a new hash that would be different from the originally-generated hash. One example of a hash that can be used in accordance with various embodiments is a sha1sum.

In some embodiments, log data can be stored in the append-only datastore which produces a first hash. In real-time, an additional hash can be generated with a different hash algorithm. In this way, in order for a malicious user to execute a hash collision attack, two unique hashes would be needed for every data chunk, and the malicious user would need to re-ingest the data chunks without being detected. This is not practicable.

In some embodiments, logs can be piped to a redundant datastore. In some embodiments, a threshold can be set/learned, where the threshold is indicative of a "normal" pace that logs are captured. In this way, any slowdown in the number of logs collected can be identified as a potential malicious attack. This may combat malicious attacks where a user disables system logging. In some embodiments, the system can be configured to send alerts in the event certain data manipulation commands are received, the append-only datastore goes down, etc.

The result is a mechanism whereby every action can be logged, and because these logs are injected back into the log stream, no part of the stack can be manipulated without producing a log that won't ultimately be stored in the append-only datastore.

Example Data Analysis System

Before describing the technology in detail, it is useful to describe an example system in which the technology may be implemented. FIG. 1 is a block diagram depicting an example data analysis system 100, consistent with embodiments of the present disclosure. Among other things, data analysis system 100 facilitates user querying of one or more data sources and presenting or displaying the query results. System 100 is shown as an arrangement of functional blocks. These functional blocks may be implemented in hardware, software, or a combination of the two. For example, the functional blocks of system 100 may be implemented as special purpose computing devices, such as application specific integrated circuits. In other examples, the functional blocks of system 100 may be implemented as software on specialized hardware.

System 100 may include user interface 110 to receive user input and generate output. User interface 110 may facilitate user interaction with system 100. User interface 110 may receive and process user text entries and graphical selections. For example, user interface 110 may receive signals from input devices, process the signals, and initiate appropriate action based on the input, such as initiating a search, rendering a graphic, or archiving results. Receiving a user-initiated mouse click, for example, may cause user interface 110 to initiate a search query. User interface 110 may also provide output for a user to view. For example, user interface 110 may display graphics, such as search results, on a display device (e.g., a monitor) for the user to view.

In some embodiments, user interface 110 may be a web application, which may run in a generic web browser. For example, user interface 110 may be a CoffeeScript application running on a web browser. In other embodiments, an independently executable program may provide user interface 110.

User interface 110 may include session manager 112 to provide administration during user interactions with system 100. For example, a user may initiate a session on system 100. Based on the session initiation, session manager 112 may set up and maintain a connection between user interface 110 and application server 120, verifying that a search engine 130 is ready to receive queries. To set up the session for a particular user, session manager 112 may load user preferences, retrieve stored results, and tie new session actions to the users account.

In some embodiments, session manager 112 may monitor user interactions with user interface 110. Based on the user action history, session manager 112 may maintain a current state of system 100. Session manager 112 may be able to recall the state of system 100 should the user need to continue working after a break, or should an error cause the session to abruptly crash. For example, session manager 112 may maintain a record of user search queries, flagged documents, and connected databases. Session manager 112 may recall the records after interruptions in the session to recreate the state of system 100 when the user last provided input. For example, a user may enter a series of interrelated queries using user interface 110. A user may provide input to format the results using a particular format, such as forming a bar graph. Due to a malfunction of system 100, user interface 110 may stop running unexpectedly. In this example situation, session manager 112 may recall the prior searches and result formats received from input. Session manager 112 may recreate the state of system 100 prior to the malfunction, which may, for example, advantageously prevent work from being lost.

In some embodiments, queries, the results of queries, as well as specific visualizations that are rendered for a first user may be shared with another user (provided the other user has the requisite authority to view the data that is the subject or such queries/visualizations. Accordingly, session manager 112 may monitor and keep track of current states of the data, visualizations, etc. In this way, shared visualizations or queries can be synchronized instances of user interface 110. For example, a first user may share a visualization with a second user. The visualization created by the first user may have specific characteristics that are captured or set forth in a "widget" and reflected in a code-like configuration specification. The widget and/or configuration specification may be shared with the second user. The second user may run the widget/execute the configuration specification on his/her own instance of user interface 110. Prior to rendering the visualization for the second user, session manager 112 may be accessed to determine the proper state of the data.

User interface 110 may include query builder 114 to manage user search queries. Query builder 114 may receive user input and identify it as search query input. In some embodiments, a user may type text into a field of user interface 110. Query builder 114 may identify the text entry of a user as a query command. In some embodiments, user interface 110 may display a visual representation of results. Responsive to a user selection of a region of the visual display, query builder 114 may create a new search query to return a subset of results corresponding to the selection region. For example, user interface 110 may display a histogram based on the creation date of documents resulting from the query "Douglas Hartford." User interface 110 may receive a user selection corresponding to the histogram bar for the year 2009. Responsive to the user selection, query builder 114 may create a new query to retrieve all documents having a creation date in the year 2009 that contain "Douglas Hartford." User selections of other graphics, such as diagrams, trees, tables, and charts may be used by query builder 114 to create similar queries.

Query builder 114 may allow a user to combine queries to filter results. Rather than storing a set of results and filtering the results into a subset, query builder 114 may combine the necessary criteria to obtain the subset into a single search. For example, a user may initially request all documents containing a reference to the entity "Bonny Smith." After viewing the results from the name query, a user may determine that they would further like to refine the results to only show "Bonny Smith" documents from the years 2012 to 2014. To obtain the refined query containing the subset, query builder 114 may combine, based on user input, the query for "Bonny Smith" and the years 2012 to 2014 into a single query, instead of applying the time range query to the actual name query results set.

In another example, a user may want to know if any documents containing "Bonny Smith" from 2012 to 2014 overlap with a set of documents related to transactions by "Clyde Jones" exceeding $10,000. In this example, query builder 114 may generate a new query based on the two queries corresponding to the results sets, rather than aggregating the results entries for each set, comparing them, and generating any overlapping documents. Using a query-based approach may advantageously provide more efficient results because, for example, the query results set from the base searches may not need to be stored or indexed. Instead, a new query may be submitted to readily search the entire collection of indexed documents.

Query builder 114 may generate queries using a standardized format. In some embodiments, a query datatype (e.g., "AbstractQuery") may define the structure used by query builder 114. For example, query builder 114 may initialize an AbstractQuery object that corresponds to given search criteria. Because AbstractQuery may be used to identify a particular set of data, a particular instance of AbstractQuery may represent a specific set of documents. For example, an instance of AbstractQuery may be used as a universal token which is passed between different processes of system 100. Thus, rather than exchanging a list of document numbers or the documents themselves, system 100 may transfer an AbstractQuery instance referencing a collection identifier to identify a particular set of documents.

The AbstractQuery class may define the format for querying various field types (e.g., text, numbers, dates). For example, an AbstractQuery instance may include a tree of Boolean filters to apply, fields to return, set orders, and limits. The class may be extensible to accommodate search field variations of unique data sets. To query documents having unusual data fields (e.g., fields containing Unicode symbols or emoji), query builder 114 may receive and initialize queries using an addendum that extends the AbstractQuery class.

When user interface 110 receives results from queries, user interface 110 may include visualizer 116 to produce graphics or other visual representation(s) illustrating the results. Visualizer 116 may receive query results from application server 120. In some embodiments, visualizer 116 may receive a list of document identifiers, such as unique document index values. The document identifiers may be accompanied by document field values. For example, a document identifier may be sent with entities associated with the document, a location, a timestamp, and a narrative. Other field values may exist to accommodate any data from any document format. The individual fields may be individually indexed.

System 100 may include application server 120 to provide network processing resources. Application server 120 may host a variety of support services and act as an interface between user interface 110 and search engine 130.

Application server 120 may include authenticator 122 to manage user identification. To determine the user to which the session belongs, authenticator 122 may receive user identifying information, such as log in credentials (e.g., username and password). Although, more robust security schemes may be used, such as biometric authentication. User authentication may enable application server 120 to retrieve prior session data and restore user workspaces.

Authenticator 122 may facilitate linking with search engine 130. In some embodiments, search engine 130 may require login credentials in order to service queries. Authenticator 122 may provide search engine 130 with the necessary user credentials, such as a user name and password. Authenticating a user at search engine 130 may allow system 100 to track individual user usage of processing resources. Based on a user's usage of search engine 130, system 100 may provide feedback to user to better optimize search strategy. Errant queries, for example, may waste processing resources of search engine 130. By tracking queries per user, system 100 may allow work to be billed on a per query basis.

It should be noted that in some embodiments, visualizations and/or reports may be shared between users. A user sharing one or more visualizations or reports to another user may not wish for the other user to change, manipulate, or otherwise interact with the shared visualizations and/or reports except to view the visualizations and/or reports. In such a scenario, user interface 110 and/or another instance of user interface 110 being used by the other user may be put into a "static" mode. In some embodiments, the widget used to generate a visualization can be protected so that execution of the widget to generate a visualization for another user is limited to displaying the visualization unless the other user can authenticate him/herself. In this static or protected mode, visualizations may only be viewed, moved (within a report, for example, and/or resized).

Application server 120 may include mid-tier logic 124 to translate search queries. Mid-tier logic 124 may receive search queries from user interface 110 and format the queries to send to search engine 130. In some embodiments, mid-tier logic 124 may reformat a query from the search object initialized by query builder 114 and create a new search instruction that may be compatible with search engine 130. Similarly, in some embodiments, mid-tier logic 124 may translate search results from search engine 130 to send to user interface 110. Mid-tier logic 124 may receive query results in a format native to the particular search backend employed by search engine 130. By reformatting the search results into a format compatible with user interface 110, mid-tier logic 124 may facilitate the efficient production of visuals based on the search results.

In some embodiments, mid-tier logic 124 may support querying multiple collections at once. Mid-tier logic 124 may submit multiple queries to search engine 130 at once and receive multiple results. For example, multiple instances of AbstractQuery may be aggregated and applied to multiple collections of documents having different formats. Mid-tier logic 124 may reformat the multiple queries for various collections into a single query to submit to search engine 130.

Application server 120 may include cache 126 to store a local copy of search request data. Cache 126 may locally store translated searches and reformatted search results. By maintaining translated versions of frequent or resource intensive searches and results, cache 126 may serve results much more quickly and reduce the burden on processing resources, such as mid-tier logic 124 and search processor 134.

In some embodiments, cache 126 may include configurable policies. A configuration file may define the amount of data stored by cache 126 and the caching trigger conditions. System 100 may alter the configuration parameters of cache 126 to match the needs of a given collection or search, based on the available resources of application server 120 and search engine 130. For example, when application server 120 processes large results sets, less memory may be free to devote to caching.

System 100 may include search engine 130 to perform searches. Search engine 130 may receive search requests from, and provide results to, application server 120. In some embodiments, search engine 130 may be a server-based enterprise search engine. For example, search engine 130 may be an Elasticsearch™ search server. However, because mid-tier logic 124 provide translation processes, search engine 130 may utilize different formats without affecting the user experience.

Search engine 130 may include one or more server hardware units. For example, search engine 130 may include one or more hardware processors (e.g., processor 604 of FIG. 6) connected to memory hardware (e.g., main memory 606, storage device 610 of FIG. 6). Search engine 130 may include a wired or wireless network interface (e.g., communication interface 618 of FIG. 6) that connects the hardware processors to a network (e.g., local network 622, Internet 628 of FIG. 6). Disclosed hardware may be programmed to perform disclosed functions. For example, memory may include instructions for a processor to perform Elasticsearch™ functions.

Search engine 130 may include storage 132 to maintain data that is subject to searching. Search engine 130 may use separate collections for each document format type. Storage 132 may include a particular data architecture to facilitate searching. A collection can refer an aggregation of data, e.g., documents, files, and the like. For example, documents in a collection could be financial transaction receipts between two parties, where the data record may indicate the details of the transaction (e.g., currency exchanged, date, time, location).

Search engine 130 may include search processor 134 to process search requests. Search processor 134 may receive and fulfill translated search requests from mid-tier logic 124. Search processor 134 may access a search index to apply the Boolean logic of a received search. For example, search processor 134 may search across de-normalized indices of multi-valued documents. Search engine 130 may receive search results based on the query.

Search engine 130 may include aggregator 136 to collect search results. As search processor 134 generates results, aggregator 136 may receive and store the generated results. Once the search processing is complete, aggregator 136 may forward the total results to application server 120. For example, aggregator 136 may serve as a local cache of results to provide complete results in a single transmission. Aggregator 136 may apply a format to the documents based on the particular search platform of search engine 130.

The particular functional blocks and arrangement of system 100 may be altered from the depicted configuration based on particular implementation details. In some embodiments, functional blocks may be combined or subdivided based on the available processing resources and hardware. Some functional blocks may be unused or omitted based on the particular application of system 100. For example, based on the given format of the collections that are subject to search, the various functional components described above may be reconfigured to better query the underlying data.

Example Data Manipulation Method

Figure 2:
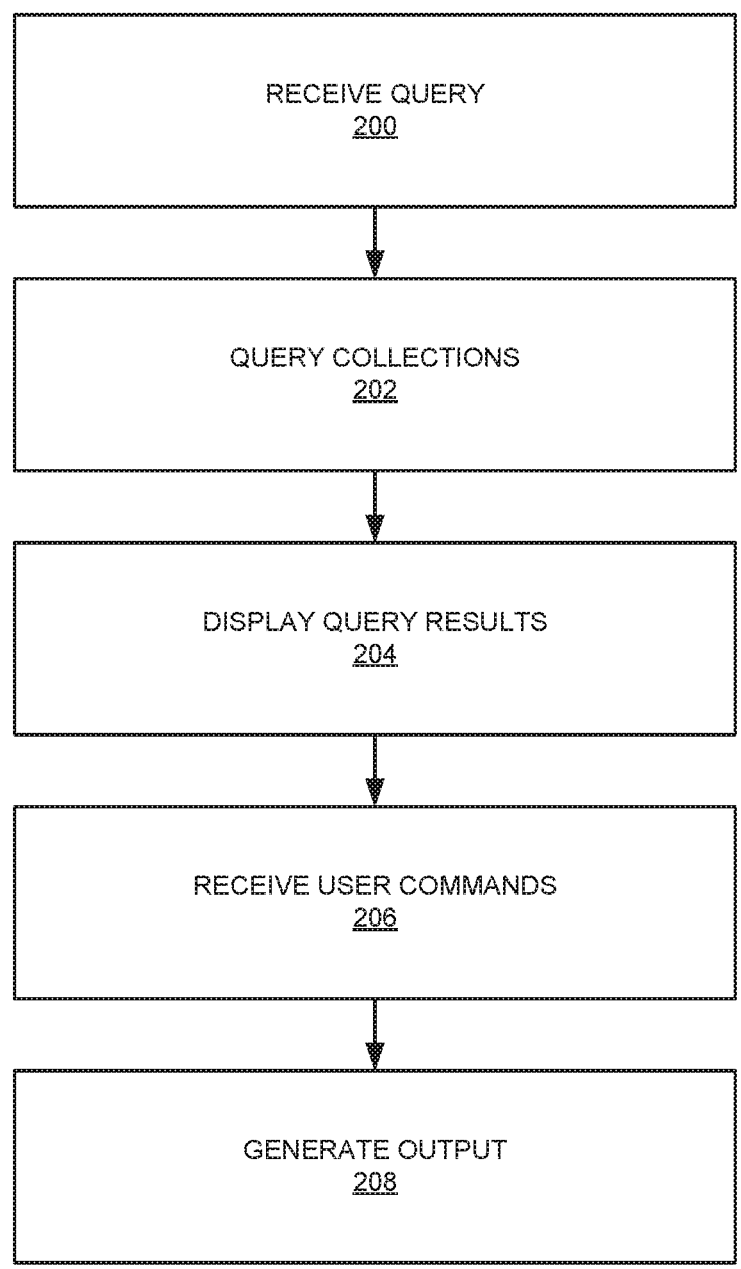
FIG. 2 is a flow chart illustrating example operations performed for querying and/or analyzing data in accordance with one embodiment of the present disclosure.

FIG. 2 is a flowchart representing example operations that may be performed by an electronic device for manipulating data, consistent with embodiments of the present disclosure. The example operations discussed may be performed by system 100. However, other hardware, software, or combinations of the two may be used to perform the operations of FIG. 2 consistent with this disclosure.

At operation 200, a query may be received. For example system 100 may receive a query from a user. In one embodiment, user interface 110 may receive user input for a search query. For example, a user may enter a text string, such as a name or phone number of interest to the user. Query builder 114 may initiate a query based on the user text input. For example, query builder 114 may initialize an AbstractQuery object corresponding to the query text.

In one embodiment, query builder 114 may generate a query based on a user selection. A user may select a field of a displayed document or graph. For example, a user may select a bar of a histogram corresponding to the month of March for the year 2013. Query builder 114 may generate a query based on month and year, as well as, the initial query on which the histogram is based. For example, query builder 114 may combine the logic of the sequential selection with the initial query to create a new instance of an AbstractQuery object.

At operation 202, one or more collections may be queried. That is, query builder 114 may transmit a query to search engine 130 via application server 120. In an embodiment, query builder 114 may transmit an instance of an AbstractQuery object to mid-tier logic 124 for reformatting to be compatible with search engine 130. Once search processor 134 receives the translated search, it processes the request with aggregator 136 storing the ongoing results.

In an embodiment, prior to processing the query, search engine 130 may communicate with authenticator 122 to determine whether the current user of the session has sufficient credentials to perform the search on a particular collection. For example, authenticator 122 may provide a security token or cryptographic key indicating that the search may be performed. As alluded to above, authenticator 122 may be invoked to determine what level (if any) a user may have with a particular visualization or report.

At operation 204, query results may be displayed. For example, user interface 110 may display the results of the query received at operation 200. Once search processor 134 completes processing of a particular search, aggregator 136 may provide the search results to mid-tier logic 124, which may translate the search results into a format for user interface 110. User interface 110 may generate a graphical display of the reformatted results. For example, visualizer 116 may generate a grid of results, with fields of resulting documents being arranged in columns.

At operation 206, additional user commands may be received. In an embodiment, user input may result in an additional query. As discussed previously, a user may provide input to further filter results of an initial query. Based on user input, after displaying query results (operation 204), system 100 may generate an additional query, and the illustrated method may return to operation 200.

At operation 208, some output based on search results may be generated. In an embodiment, visualizer 116 may render a chart. For example, visualizer 116 may calculate histogram values or pie chart values for a specific field of the search result documents. Visualizer 116 may produce other chart types based on configuration settings, such as user configurable graph settings or third party graph plug-ins.

In an embodiment, operation 208 may include user interface 110 exporting the search results. User interface 110 may generate a file of raw text data or a common spreadsheet file format (e.g., Excel) to allow the user to use the search results data. In some embodiments, user interface 110 may permit the user to share the data to a workgroup within an organization or user social media. Sharing settings may be controlled by authenticator 122 based on user permission of collection configuration file. In some embodiments, system 100 may archive frequently used queries. For example, user interface 110 may store popular AbstractQuery instances. System 100 may facilitate or control the sharing of search results using other export and archive mechanisms consistent with this disclosure.

Operations 200-208 are discussed above in a particular order. However, certain operations may be rearranged or omitted. For example, the displaying of query results (operation 204) may not occur until after receiving additional user input (operation 206) indicating results display preferences. Other variations and permutations of process operations may be performed consistent with this disclosure.

Operations such as receiving a query (operation 200), querying collections (operations 202), receiving user commands (operation 206) may involve some form of a read action, write action, or other form of data manipulation. Accordingly, any one or more of these operations may be a point of attack on system 100. For example, a user may initiate a query in an attempt to read data the user is unauthorized to read. User commands received by system 100 may involve the unauthorized manipulation of data in a queried collection, writing data to a collection, etc. Other attacks may include role collusion, where an unauthorized user colludes with an authorized user of system 100 to read or manipulate data, and the authorized user deletes any log/record of that authorized user's actions relating to the reading or manipulating of data. It can be appreciated that without a tamper-proof system and method of logging or tracking user activity, the protections afforded by authenticator 102 can be bypassed by virtue of these actions being performed by an authorized user on behalf of an unauthorized user.

Example Security Control

Figure 3:
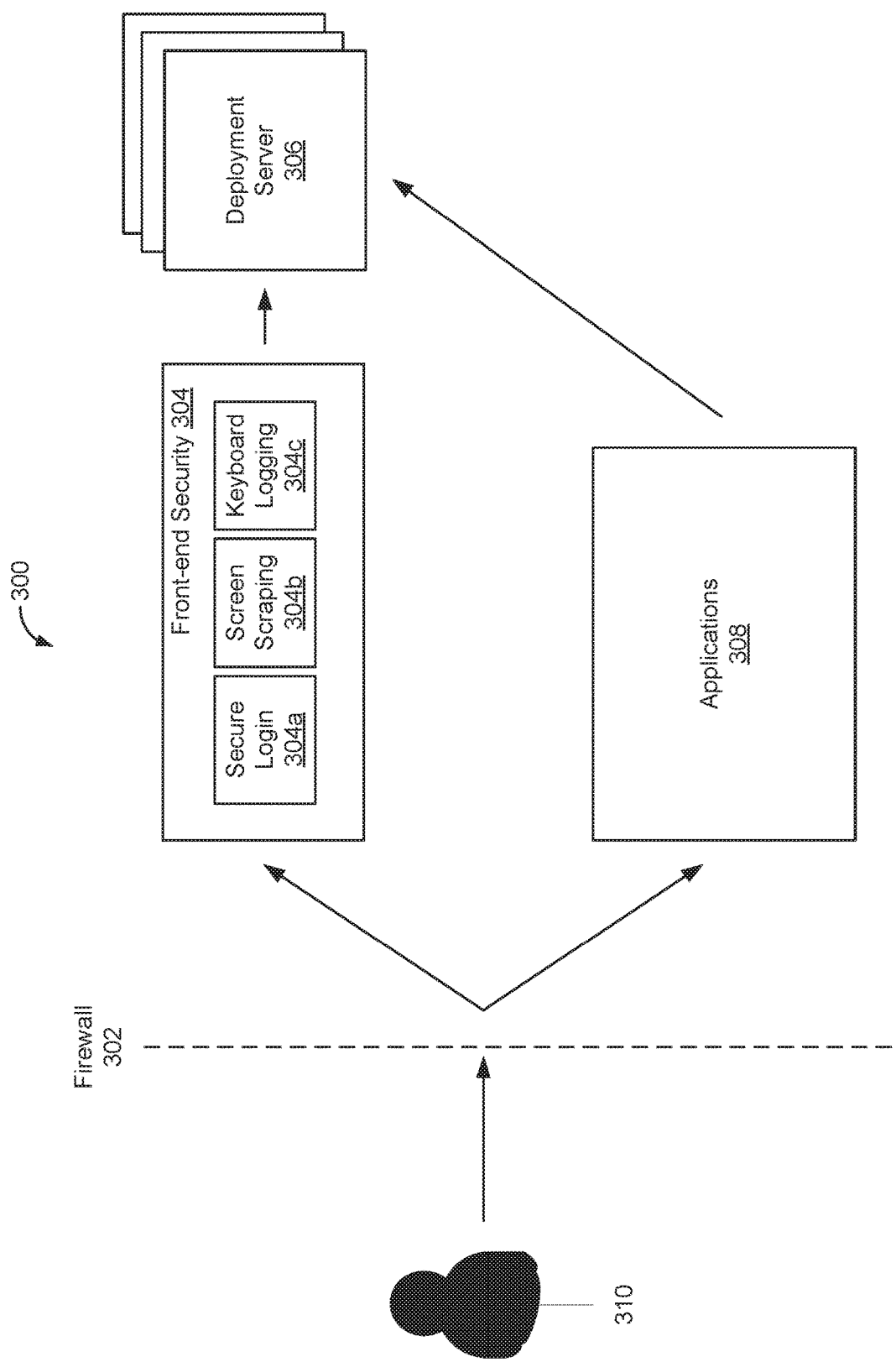
FIG. 3 illustrates a high-level security control system architecture in accordance with one embodiment of the present disclosure.

FIG. 3 illustrates a high-level system architecture of a security control system 300 in accordance with various embodiments of the present disclosure. System 300 can be configured to provide security control through two avenues, maintaining the security of a deployment and providing the ability to log actions, monitor access, and uncover unauthorized access/use at a deployment. System 300 may include a firewall 302. As would be understood by those of ordinary skill in the art, a firewall can refer to a security system or aspect of a security system that monitors and controls incoming and outgoing traffic. As illustrated in FIG.

3, firewall 302 may establish a protective barrier between one or more deployment servers 306. Configuration of firewall 302 may be automated through one or more applications 308, e.g., a web-based application providing configuration management for system 300. In particular, firewall 302 can be configured to deny any unauthorized connection attempts to a deployment server 306.

In some embodiments, one or more applications 308 may further include an intrusion detection system that monitors all components of system 300 and records any attempt/action comprising a circumvention of system 300's security protocols.

Deployment server 306 may include automated STIG compliance functionality. As noted above, compliance with STIG can entail automatically modifying an operating system running on a deployment server 306 in order to set strict defaults for security-related functions. For example, deployment servers may enable a feature whereby a user is automatically logged out after some specified amount of time that the user is inactive.

Applications 308 as well as deployment servers 306 may include an audit component adapted to monitor system calls. In some embodiments, the audit component taps into the kernel (of a host on which applications 308 runs and/or deployment server 306) to obtain and provide information regarding the operating conditions or characteristics of the host/deployment server 306. For example, the audit component may generate a system call whenever user 310 performs an action on or involving deployment server 306 so that a log of that action can be generated.

The above-noted action log can be stored in a tamper-proof logging component at deployment server 306 and/or some other customer or 3$^{rd}$ party datastore (as will be discussed below). The tamper-proof logging component can maintain and provide a full audit trail of any and all activity on deployment server 306. An entire lifecycle of data stored in/accessed through deployment server 306 can be logged. Every read, write, and/or data manipulation action involving such data may be monitored and logged, as well as information or metadata associated with the user(s), e.g., user 310, performing the action(s), the time and date of the action(s), and information identifying or characterizing the action(s). The tamper-proof logging component provides an immutable log of this activity such that no user, e.g., user 310, can modify the log. And even if the log can be modified, as discussed above, the logs can be streamed or forwarded to other datastores, allowing a comparison of logs to determine if a log has been modified. It should be noted that one or more applications 308, in addition to providing configuration management, may provide a front-end log access mechanism allowing an administrator to access the logs created by the tamper-proof logging component.

Front-end security component 304 may include a secure login component 304a, a screen scaping component 304b, and a keyboard logging component 304c. Secure login component 304a may be an embodiment of or work in conjunction with authenticator 122 (FIG. 1) to enable a first line of defense against would-be attackers by controlling access to system 300 and/or any of its components, e.g., deployment server 306. Screen scraping component 304b may extract data from the output of a search result, e.g., tabular data, data visualizations, etc. as described above. Keyboard logging component 304c monitors and logs all keyboard activity of a user accessing or using system 300. For example, any and all keystrokes made by user 310 can be logged and may be stored along with action logs discussed above.

By virtue of providing security control through one or more applications 308, a customer or entity operating or accessing a deployment server, e.g., deployment server 306, can control how security measures are implemented, to what extent, who may be allowed access, etc. Moreover, the customer or operating entity can monitor activity on system 300, as well as investigate any activity occurring on system 300.

Figure 4:
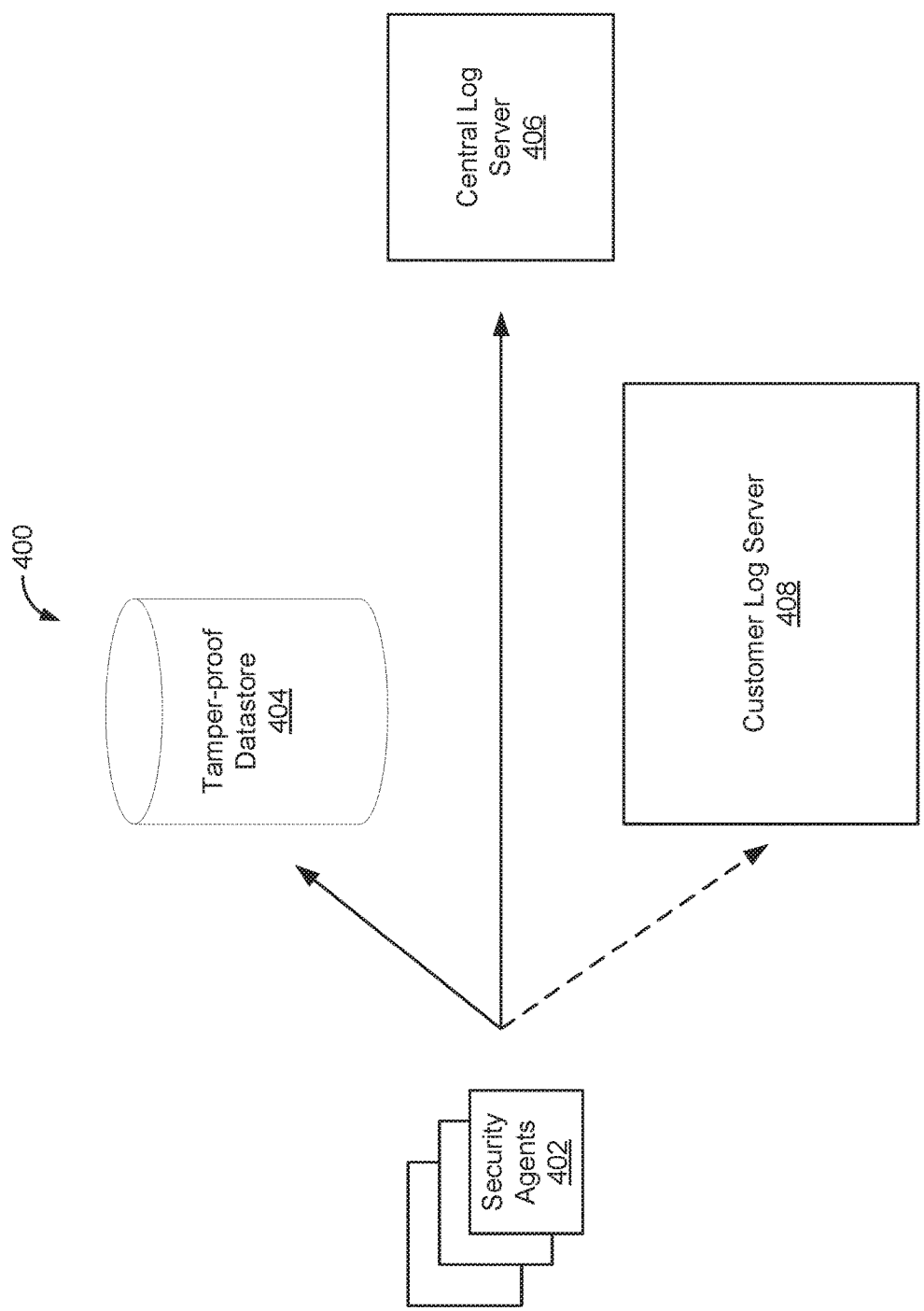
FIG. 4 illustrates an example representation of tamper-proof logging effectuated by the security control system of FIG. 3.

FIG. 4 illustrates an example representation of the tamper-proof logging effectuated by security control system 300. Security agents 402 may be one or more embodiments of applications 308 (FIG. 3). The aforementioned audit component adapted to monitor system calls may generate a system call whenever user 310 performs an action on or involving deployment server 306 so that a log of that action can be generated. This action log can be stored in a tamper-proof logging component, e.g., tamper-proof datastore 404. It should be understood that tamper-proof datastore 404 may be implemented or located at deployment server 306. Additionally, action logs may be stored at a central log server 406, as well as at a customer log server 408. Storage of these action logs provides redundancy and a mechanism for comparing logs should one of the logs be manipulated by deleting records of actions to hide malicious activity. The same holds true for tamper-proof logging component. That is, logs of a data lifecycle, as well as any read, write, and/or data manipulation action involving such data may be stored in tamper-proof datastore 404 along with information identifying the user(s) associated with the action(s) and the actions themselves, and the time and date of the action(s). The logs may also be stored at central log server 406 and optionally, at separate customer log server 408.

Example Tamper-Proof Logging System and Method

Figure 5A:
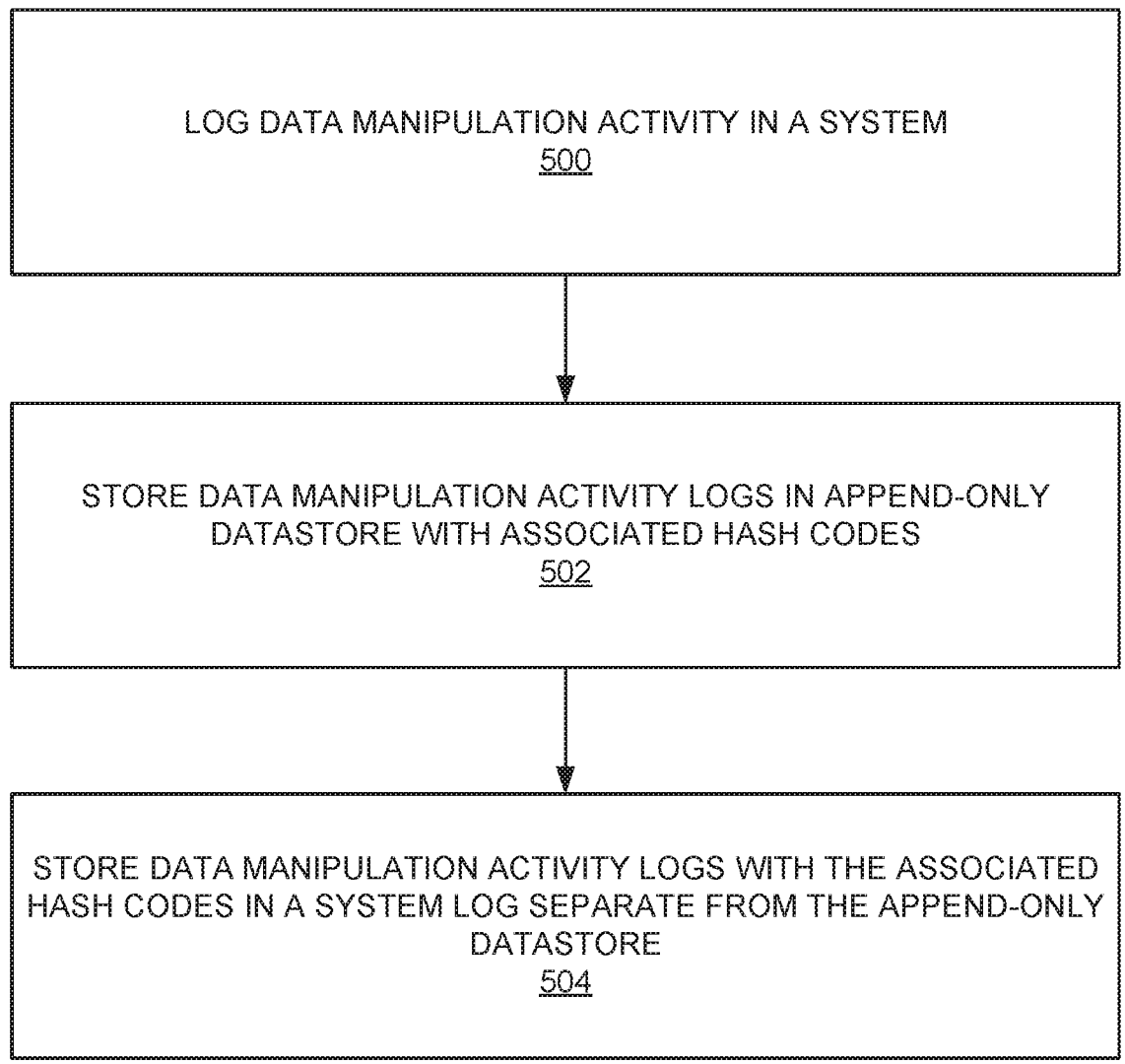
FIG. 5A is a flow chart illustrating examples operations that can be performed for effectuate tamper-proof logging in accordance with one embodiment.

FIG. 5A illustrates example operations that can be performed to effectuate tamper-proof logging. FIG. 5A will be described in conjunction with FIG. 5B, which illustrates an example tamper-proof logging system architecture.

At operation 500, data manipulation activity in a system is logged. For example, referring back to FIG. 3, user 310 may engage in read, write, or other data manipulation activity, such as querying some data collection, writing over data in a data collection, etc. As previously discussed, one or more applications 308 may provide certain security controls mechanisms including, for example, auditing at a system level. In particular, an application host 510 may include an intrusion detection component 512 that monitors and detects any attempts to circumvent security protocols. This can be accomplished by storing the file state of application host 510 so that any modification to system files can be identified.

Application host 510 may further include system logging components/services, i.e., system log component 514 and audit component 516. System log component 514 performs direct system level logging regarding system operation, i.e., what is happening at application host 510. As previously discussed, audit component 516 provides detailed logging of user actions and how an application interacts with application host 510 by tapping into the kernel of application host 510. That is, anytime a user performs an action, a system call can be generated and logged.

Additionally still, application host 510 may include a kernel security component 518 that logs any potential conflicts regarding access restriction. In the illustrated example, this kernel security component 518 is embodied as a security-enhanced Linux component. In some embodiments, kernel security component 518 may not be involved in the enforcement of security protocols pursuant to an access restriction conflict. In other embodiments, kernel security component 510 may be configured to operate in an enforcement mode if needed to implement a more serious system lockdown.

Furthermore, application host 510 may include a log collection/processing component 520. Log collection/processing component 520 can scrape application host 510 logs and forward them to a centralized log server. In other words, log collection/processing component 520 can obtain the system logs generated by system log component 514, audit component 516, and/or kernel security component 518 for storage. It should be noted that in some embodiments, log collection/processing component 520 can be implemented using Filebeat™.

Utility server 530 may include its own intrusion detection component 532, system log component 534, audit component 536, kernel security component 538, and log collection/processing component 540. These components of utility server 530 can perform the same or similar functions as those included in application host 510, but from the perspective of utility server 530 rather than application host 510. In other words, the logs reflect activity, attempted circumvention of security protocols, and/or the like, occurring at utility server 530.

Utility server 530 may further include a keystroke log component 546, which may be an embodiment of the aforementioned keyboard logging component 304C (FIG. 3). In some embodiments, users can be required to log into front-end security component 304 through secure login component 304a so that all keystrokes that a user inputs can be logged. Keystroke log component 546 may be presented using a web-based UI via keystroke server 548. For example, keystroke log component 546 may be provided through a Jetty web server. Keystroke log component 546 can manage the entry of system-level usernames and passwords as well as performing authentication (e.g., two-factor authentication) at utility server 530. Keystroke log component 546 may further capture keystrokes associated with terminal access including multiple, simultaneous terminal entries and in-browser file uploads. In other words, keystroke log component 546 can provide access accountability and security with any login activity at and/or directed to utility server 530.

Referring back to FIG. 5A, data manipulation activity logs are stored in an append-only datastore with associated hash codes at operation 502. At operation 504, the data manipulation logs are stored with the associated hash codes in a system log separate from the append-only datastore. Storing activity logs in at least two separate datastores where at least one of the two datastores is immutable provides a system wherein no portion of the system can be manipulated without a record of that manipulation. Moreover, as will be described below, the manner in which activity logs are stored (generating hash codes used to store the activity logs in an immutable datastore) makes it difficult to delete or cover up malicious activity. Further still, some embodiments utilize different hash algorithms to generate unique hash codes to protect against hash collision attacks.

In particular, user activity logs, keystroke logs, system logs, etc. from application host 510 and utility server 530 may be sent to a log pipeline component 550 that can accept log files and execute transforms to modify the log files into a desired format for storage and/or presentation/analysis.

Figure 5B:
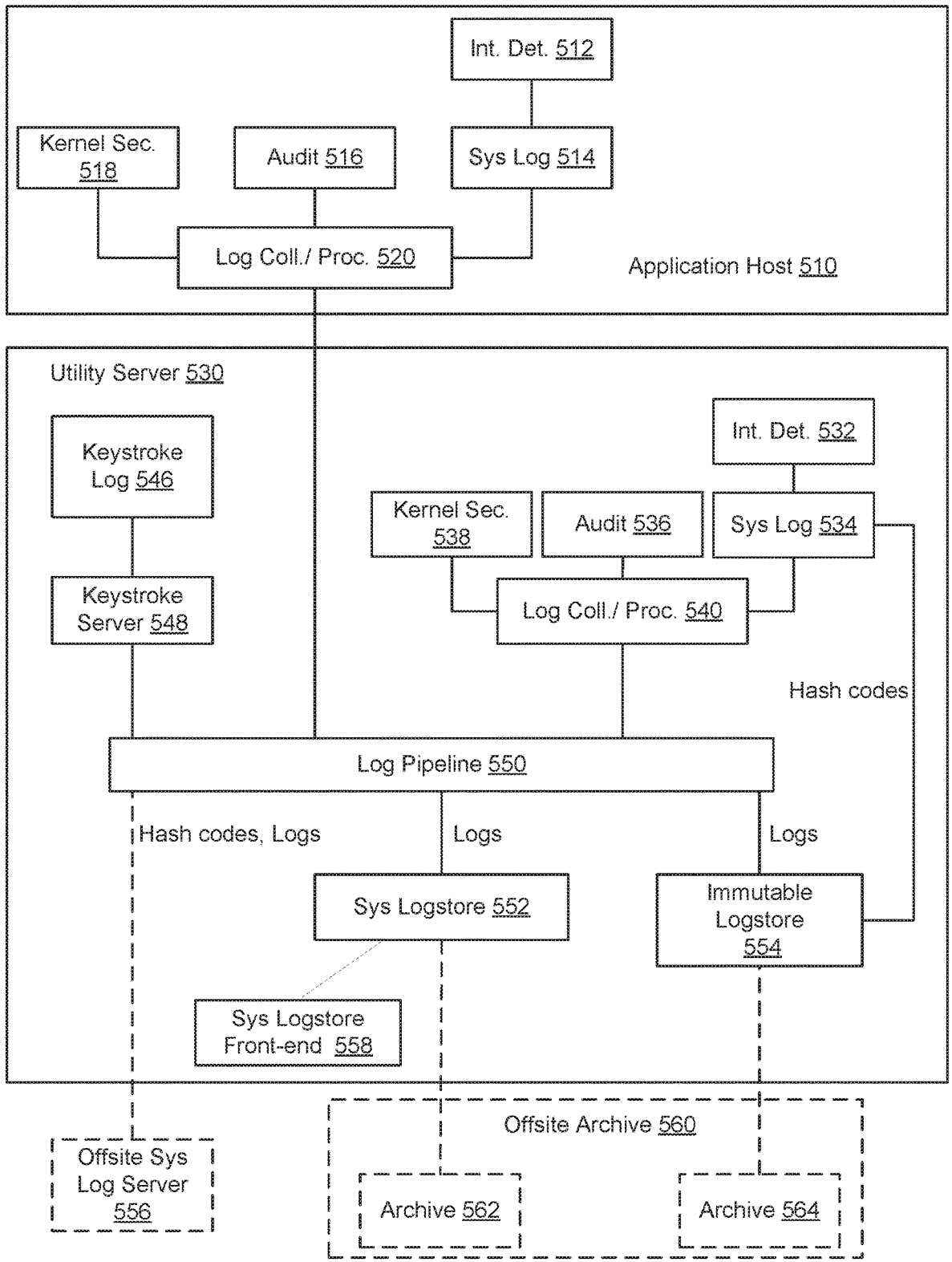
FIG. 5B illustrates an example tamper-proof logging system architecture in accordance with one embodiment.

FIG. 5B illustrates that the activity logs received and processed by log pipeline component 550 can be stored in multiple locations. In the illustrated example, activity logs may be stored in a system logstore 552, an immutable logstore 554, and optionally, at an offsite system log server 556. System logstore 552 may be an embodiment of the central log server 406 (FIG. 4). Immutable logstore 554 may be an embodiment of the tamper-proof datastore 404 (FIG. 4). Optional offsite system log server 556 may be an embodiment of the customer log server 408 (FIG. 4).

Storage of the activity logs in system logstore 552 allows a user, such as a system administrator, to review activity as needed. As part of routine maintenance or security checks, the user may access system logstore 552 to determine activity that has/is occurring on application host 510, for example. In some embodiments, system logstore 552 may be implemented using the Elasticsearch™ search engine. The transformation of activity logs at log pipeline component 550 may include transformation of the activity logs into a format useable by system logstore 552. A system logstore front-end 558 may be used to view/analyze the activity logs stored in system logstore 552. In one embodiment, system logstore front-end 558 may be implemented using Kibana™, a data visualization plugin compatible with the Elasticsearch™ search engine.

To store the activity log in immutable logstore 554, which comprises an append-only datastore, activity log files may be broken up into subsets or "chunks" of activity log files. In some embodiments, activity log files may be broken up into, e.g., 50 kb chunks of data. Immutable logstore 554 receives these data chunks representative of the activity log files, compresses the data chunks, and generates hash codes used to store the compressed data chunks. The hash codes generated by immutable logstore 554 can be re-stored as part of the system log vis-à-vis system log component 534. As alluded to above, an example hash code that can be utilized in accordance with some embodiments, is a sha-1 hash code or some variant thereof. That is, the output of the hash algorithm, i.e., the hash code, may be a hash/hash value, where data integrity can be verified by using a checksum. In the case of a sha-1 hash algorithm, data integrity can be verified by using a sha1sum. The hash codes used for storing the data chunks in immutable logstore 554 can be the block addresses by which the data chunks can be accessed in immutable logstore 554.

In some embodiments, different hash algorithms can be used to generate unique hash codes in real-time to avoid hash collision attacks.

Additionally, the activity logs files may optionally be sent to an offsite system log server 556, which again may be a customer log server, along with the hash codes generated by immutable logstore 554. In order for a customer, e.g., data analyst, to review the activity logs, the customer may simply request the generated hash codes, and access the activity logs using the particular hash codes associated with the data chunks. In this way, the integrity of activity logs can be verified.

A result of the above-described system and method of storing activity logs is that it becomes difficult to hide malicious activity. For example, in order to hide malicious activity by deleting a portion of an activity log, a malicious actor would first need to delete the relevant portion of the activity log to hide evidence of the malicious activity in system logstore 552. The malicious actor would then need to ascertain the location, in immutable datastore 554, at which that portion of the activity log is stored, and delete that portion of the activity log. However, re-storing the activity log or data chunk minus the deleted portion would entail immutable logstore 554 generating another hash code. This hash code would be different from the one originally generated when the activity log/data chunk was first stored in immutable logstore 554. Because, as noted above, the hash codes generated by immutable logstore 554 are re-stored, a system administrator would recognize this discrepancy in hash codes upon review. Further still, the malicious actor would have to "re-align" time of activity information, date of activity information, etc. It should be noted that in every application host, e.g., application host 510, a time synchronization mechanism may be implemented to maintain accurate and consistent time across an entire system, resulting in more accurate activity logs, and a way to diagnose potential malicious activity. Effectively, hiding activity becomes a practical impossibility, or at the least involves measures that go beyond what most malicious actors are capable of taking.

In some embodiments, utility server 530 can be configured to send alerts regarding certain activity. For example, if a user runs certain commands and/or the immutable logstore 554 goes down, an alert can be triggered. Alerts may be logged and sent to one or more local and/or remote users and/or systems (e.g., an administrator system). Moreover, in some embodiments, activity logs stored in system logstore 552 and immutable logstore 554 may be periodically archived to another system, such as offsite archive 560. Offsite archive 560 can maintain a system logstore archive 562 and an immutable logstore archive 564.

Example Computer System

Figure 6:
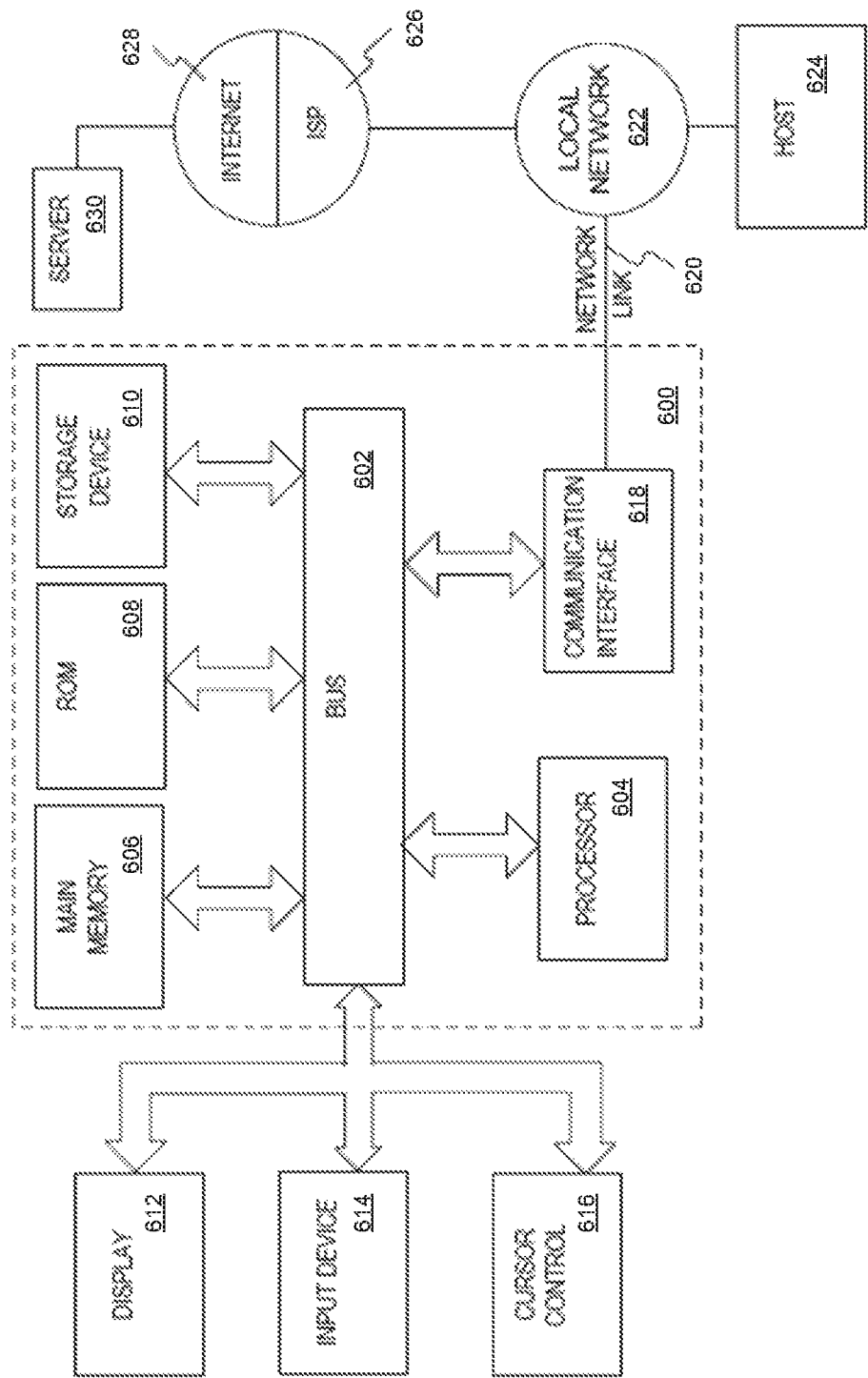
FIG. 6 illustrates a schematic representation of an example computer system in which any of the embodiments described herein may be implemented.

FIG. 6 is a block diagram of an exemplary computer system 600 with which embodiments described herein can be implemented, consistent with embodiments of the present disclosure. Computer system 600 includes a bus 602 or other communication mechanism for communicating information, and one or more hardware processors 604 (denoted as processor 604 for purposes of simplicity) coupled with bus 602 for processing information. Hardware processor 604 can be, for example, one or microprocessors.

Computer system 600 also includes a main memory 606, such as a random access memory (RAM) or other dynamic storage device, coupled to bus 602 for storing information and instructions to be executed by processor 604. Main memory 606 also can be used for storing temporary variables or other intermediate information during execution of instructions to be executed by processor 604. Such instructions, after being stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

Computer system 600 can be coupled via bus 602 to a display 612, such as a cathode ray tube (CRT), a liquid crystal display (LCD), or a touch screen, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Computer system 600 can include a user interface component to implement a graphical user interface (GUI) that can be stored in a mass storage device as executable software codes that are executed by the one or more computing devices. This and other components can include, by way of example, components, such as software components, object-oriented software components, class components and task components, processes, functions, fields, procedures, subroutines, segments of program code, drivers, firmware, microcode, circuitry, data, databases, data structures, tables, arrays, and variables.

In general, the word "component," as used herein, refers to logic embodied in hardware or firmware, or to a collection of software instructions, possibly having entry and exit points, written in a programming language, such as, for example, Java, Lua, C or C++. A software component can be compiled and linked into an executable program, installed in a dynamic link library, or written in an interpreted programming language such as, for example, BASIC, Perl, or Python. It will be appreciated that software components can be callable from other components or from themselves, and/or can be invoked in response to detected events or interrupts. Software components configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware components can be comprised of connected logic units, such as gates and flip-flops, and/or can be comprised of programmable units, such as programmable gate arrays or processors. The components or computing device functionality described herein are preferably implemented as software components, but can be represented in hardware or firmware. Generally, the components described herein refer to logical components that can be combined with other components or divided into sub-components despite their physical organization or storage.

Computer system 600 can implement the techniques described herein using customized hard-wired logic, one or more ASICs or FPGAs, firmware and/or program logic which in combination with the computer system causes or programs computer system 600 to be a special-purpose machine. According to some embodiments, the operations, functionalities, and techniques and other features described herein are performed by computer system 600 in response to processor 604 executing one or more sequences of one or more instructions contained in main memory 606. Such instructions can be read into main memory 606 from another storage medium, such as storage device 610. Execution of the sequences of instructions contained in main memory 606 causes processor 604 to perform the process operations described herein. In alternative embodiments, hard-wired circuitry can be used in place of or in combination with software instructions.

The term "non-transitory media" as used herein refers to any non-transitory media storing data and/or instructions that cause a machine to operate in a specific fashion. Such non-transitory media can comprise non-volatile media and/or volatile media. Non-volatile media can include, for example, optical or magnetic disks, such as storage device 610. Volatile media can include dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media can participate in transferring information between storage media. For example, transmission media can include coaxial cables, copper wire and fiber optics, including the wires that comprise bus 602. Transmission media can also take the form of acoustic or light waves, such as those generated during radio-wave and infra-red data communications.

Various forms of media can be involved in carrying one or more sequences of one or more instructions to processor 604 for execution. For example, the instructions can initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 can optionally be stored on storage device 610 either before or after execution by processor 604.

Computer system 600 can also include a communication interface 618 coupled to bus 602. Communication interface 618 can provide a two-way data communication coupling to a network link 620 that can be connected to a local network 622. For example, communication interface 618 can be an integrated services digital network (ISDN) card, cable modem, satellite modem, or a modem to provide a data communication connection to a corresponding type of telephone line. As another example, communication interface 618 can be a local area network (LAN) card to provide a data communication connection to a compatible LAN. Wireless links can also be implemented. In any such implementation, communication interface 618 can send and receive electrical, electromagnetic or optical signals that carry digital data streams representing various types of information.

Network link 620 can typically provide data communication through one or more networks to other data devices. For example, network link 620 can provide a connection through local network 622 to a host computer 624 or to data equipment operated by an Internet Service Provider (ISP) 626. ISP 626 in turn can provide data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, can be example forms of transmission media.

Computer system 600 can send messages and receive data, including program code, through the network(s), network link 620 and communication interface 618. In the Internet example, a server 630 can transmit a requested code for an application program through Internet 628, ISP 626, local network 622 and communication interface 618.

The received code can be executed by processor 604 as it is received, and/or stored in storage device 610, or other non-volatile storage for later execution. In some embodiments, server 630 can provide information for being displayed on a display.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a stand-alone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently.

"Open source" software is defined herein to be source code that allows distribution as source code as well as compiled form, with a well-publicized and indexed means of obtaining the source, optionally with a license that allows modifications and derived works.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and datastores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

The invention claimed is:

1. A system comprising:
one or more processors; and
a memory storing instructions that, when executed by the one or more processors, cause the system to perform:
logging data manipulation activity in the system;
storing data manipulation activity logs in an append-only datastore with associated hash codes;
re-storing the data manipulation activity logs with the associated hash codes in a system log separate from the append-only datastore;
deleting, responsive to a user request, a portion of a first data manipulation activity log stored in the system log in association with a first hash code;
receiving, at the append-only datastore, a request to re-store the first data manipulation activity log as a modified version of the first data manipulation activity log with the portion deleted;
generating a second hash code responsive to receiving the request to re-store the first data manipulation activity log as the modified version;
re-storing the first data manipulation activity log as the modified version in the append-only datastore; and
re-storing the first data manipulation activity log as the modified version in the system log in association with the second hash code,
wherein a discrepancy between the first hash code and the second hash code indicates that the user request is associated with malicious activity.

2. The system of claim 1, wherein storing the data manipulation activity logs comprises encrypting the data manipulation activity logs and compressing the data manipulation activity logs.

3. The system of claim 1, wherein the associated hash codes comprise sha-1 hash codes.

4. The system of claim 3, wherein the sha-1 hash codes comprise block addresses through which the data manipulation activity logs are accessed in the append-only datastore.

5. The system of claim 1, wherein the data manipulation logs stored in the append-only datastore are immutable.

6. The system of claim 1, wherein the data manipulation activity comprises at least one of data manipulation activity at the system level, and data manipulation activity associated with user action at the system.

7. The system of claim 1, wherein the memory stores instructions, that when executed by the one or more processors, further cause the system to perform:
logging additional data manipulation activity at one or more deployment servers operatively connected to the system.

8. The system of claim 7, wherein the data manipulation activity comprises at least one of data manipulation activity at the deployment server level, data manipulation activity associated with user action at the deployment server level, and interactions between the system and one or more applications executing on the one or more deployment servers.

9. The system of claim 7, wherein the memory stores instructions, that when executed by the one or more processors, further cause the system to perform:
generating additional hash codes based on the logged additional data manipulation activity;
storing additional data manipulation activity logs in the append-only datastore with the generated additional hash codes; and
storing the data manipulation activity logs in a system level log without the generated additional hash codes.

10. The system of claim 1, wherein the memory stores instructions, that when executed by the one or more processors, further cause the system to perform:
logging keystroke activity based on user inputs to the system;
storing keystroke activity logs in the append-only datastore with associated hash codes; and
storing the keystroke activity logs with the associated hash codes in the system log separate from the append-only datastore.

11. The system of claim 1, wherein the memory stores instructions, that when executed by the one or more processors, further cause the system to perform:

logging potential access restriction conflicts at the system;

storing potential access restriction conflicts logs in the append-only datastore with associated hash codes; and storing the potential access restriction conflicts logs with the associated hash codes in the system log separate from the append-only datastore.

12. The system of claim 1, wherein the instructions, that when executed by the one or more processors, cause the system to store the data manipulation activity logs in the append-only datastore comprises instructions, that when executed by the one or more processors, cause the system to perform:

breaking up the data manipulation activity logs into data chunks; and compressing the data chunks.

13. A method being implemented by a computing system including one or more physical processors and storage media storing machine-readable instructions, the method comprising:

logging data manipulation activity in the computing system;

generating hash codes based on the logged data manipulation activity;

storing data manipulation activity logs in an append-only datastore with the generated hash codes;

re-storing the data manipulation activity logs with the generated hash codes in a system log separate from the append-only datastore;

deleting, responsive to a user request, a portion of a first data manipulation activity log stored in the system log in association with a first hash code;

receiving, at the append-only datastore, a request to re-store the first data manipulation activity log as a modified version of the first data manipulation activity log with the portion deleted;

generating a second hash code responsive to receiving the request to re-store the first data manipulation activity log as the modified version;

re-storing the first data manipulation activity log as the modified version in the append-only datastore; and re-storing the first data manipulation activity log as the modified version in the system log in association with the second hash code, wherein a discrepancy between the first hash code and the second hash code indicates that the user request is associated with malicious activity.

14. The method of claim 13, wherein the hash codes comprise sha-1 hash codes.

15. The method of claim 14, wherein the sha-1 hash codes comprise block addresses through which the data manipulation activity logs are accessed in the append-only datastore.

16. The method of claim 13, further comprising:

logging additional data manipulation activity at one or more deployment servers operatively connected to the computing system;

generating additional hash codes based on the logged additional data manipulation activity;

storing additional data manipulation activity logs in the append-only datastore with the generated additional hash codes; and storing the additional data manipulation activity logs without the generated additional hash codes in the system log separate from the append-only datastore.

17. The method of claim 13, further comprising re-storing the generated hash codes as part of the data manipulation activity logs.

18. The method of claim 17, further comprising storing the data manipulation activity logs with the generated hash codes in a customer-controlled system log separate from the append-only datastore.

19. The method of claim 13, further comprising breaking up the data manipulation activity logs into data chunks, and compressing the data chunks prior to storing the data manipulation activity logs.

20. The method of claim 13, further comprising:

detecting a first timestamp associated with re-storing the first data manipulation activity log in the system log with the first hash code;

detecting a second timestamp associated with re-storing the first data manipulation activity log in the system log as the modified version in association with the second hash code; and determining that a discrepancy between the first timestamp and the second timestamp violates a time synchronization mechanism of the computing system.

* * * * *